United States Patent
Feng et al.

(10) Patent No.: US 8,042,153 B2
(45) Date of Patent: Oct. 18, 2011

(54) REDUCING OVERHEAD ASSOCIATED WITH DISTRIBUTED PASSWORD POLICY ENFORCEMENT OPERATIONS

(75) Inventors: Daw Feng, Austin, TX (US); Kristin Marie Hazlewood, Austin, TX (US); Gary Dale Williams, Driftwood, TX (US)

(73) Assignee: International Business Machines Corporation, Armonk, NY (US)

( * ) Notice: Subject to any disclaimer, the term of this patent is extended or adjusted under 35 U.S.C. 154(b) by 934 days.

(21) Appl. No.: 11/971,382

(22) Filed: Jan. 9, 2008

(65) Prior Publication Data
US 2009/0178105 A1 Jul. 9, 2009

(51) Int. Cl.
*G06F 17/00* (2006.01)
*G06F 7/04* (2006.01)
*G06F 17/30* (2006.01)
*G06F 15/16* (2006.01)
*H04L 29/06* (2006.01)

(52) U.S. Cl. ..................... 726/2; 726/1; 726/5
(58) Field of Classification Search ............ 726/11, 726/12, 1–5; 709/203, 219, 225
See application file for complete search history.

(56) References Cited

U.S. PATENT DOCUMENTS

| | | | |
|---|---|---|---|
| 6,202,157 B1 | 3/2001 | Brownlie et al. | |
| 6,665,674 B1 * | 12/2003 | Buchanan et al. | 1/1 |
| 6,941,465 B1 | 9/2005 | Palekar et al. | |
| 7,165,182 B2 | 1/2007 | Excoffier et al. | |
| 7,174,563 B1 | 2/2007 | Brownlie et al. | |
| 2002/0078386 A1 | 6/2002 | Bones et al. | |
| 2004/0093519 A1 * | 5/2004 | Grobman | 713/201 |
| 2005/0071421 A1 * | 3/2005 | Calo et al. | 709/203 |
| 2005/0114673 A1 | 5/2005 | Raikar et al. | |
| 2006/0235850 A1 * | 10/2006 | Hazelwood et al. | 707/9 |
| 2007/0025302 A1 * | 2/2007 | Zhang et al. | 370/338 |

FOREIGN PATENT DOCUMENTS

JP 2006318304 A 11/2006

OTHER PUBLICATIONS

Tivoli Directory Server Documentation for Version 6.1; Published 2007; 54 pages; Retrieved from http://publib.boulder.ibm.com/infocenter/tivihelp/v2r1/index.jsp; section Securing Directory Access and Distributed Directories.*

Tsai et al., "Simulation Verification and Validation by Dynamic Policy Enforcement", Proceedings of the 38th Annual Simulation Symposium, IEEE 2005, pp. 1-8.

(Continued)

*Primary Examiner* — Pramila Parthasarathy
*Assistant Examiner* — Chau Le
(74) *Attorney, Agent, or Firm* — Yee & Associates, P.C.; Jeffrey S. LaBaw

(57) ABSTRACT

A computer implemented method, data processing system, and computer program product for reducing the overhead associated with distributed password policy enforcement operations using a proxy server. When a proxy server provides a request from a client to a backend directory server, the proxy server determines whether a password policy check is required to be performed at the backend directory server. If a password policy check is not required to be performed at the backend directory server, the proxy server sends the client request together with a skip password policy control to the backend directory server. This skip password policy control informs the backend directory server to skip the password policy check on the client request.

19 Claims, 6 Drawing Sheets

OTHER PUBLICATIONS

Bhargavan et al., "Secure Sessions for Web Services", ACM Transactions on Information and System Security, vol. 10, No. 2, Article 8, May 2007, pp. 1-46.

Bernaschi et al., "REMUS: A Security-Enhanced Operating System", ACM Transactions on Information and System Security, vol. 5, No. 1, Feb. 2002, pp. 36-61.

Chong et al., "Security Policies for Downgrading", CCS'04, Oct. 2004, Washington DC, ACM publication, pp. 198-209.

Hicks et al., "Trusted Declassification—High-level policy for a security-typed language", PLAS'06, Jun. 2006, Ottawa Canada, ACM publication, pp. 65-74.

* cited by examiner

REDUCING OVERHEAD ASSOCIATED WITH DISTRIBUTED PASSWORD POLICY ENFORCEMENT OPERATIONS

BACKGROUND OF THE INVENTION

1. Field of the Invention

The present invention relates generally to an improved data processing system, and in particular to reducing the overhead associated with distributed password policy enforcement operations.

2. Description of the Related Art

A directory is a special type of database for managing information about people, organizations, data processing systems, and other information sources. Information within a directory is organized within a hierarchical namespace. Each entry in the directory is a named object and consists of a set of attributes. Each attribute has a defined attribute type and one or more values. Each entry is identified by an unambiguous distinguished name (DN), wherein a distinguished name is a concatenation of selected attributes from an entry. A directory service provides a mechanism for searching a directory and for retrieving information from a directory. Various standards have been promulgated for defining directories and directory services. For example, the X.500 specifications define a directory standard; more information can be found in Weider et al., "Technical Overview of Directory Services Using the X.500 Protocol", Internet Engineering Task Force (IETF) RFC 1309, March 1992. As another example, the Lightweight Directory Access Protocol (LDAP) specifications define a protocol for accessing a directory that supports the X.500 directory model; more information can be found in Wahl et al., "Lightweight Directory Access Protocol (v3)," IETF RFC 2251, December 1997.

A logical representation of a directory does not necessarily reflect an organization of the physical storage of the directory. In a manner similar to many types of memory systems, a directory may be logically supported as a cohesive whole yet physically supported in a distributed manner. For example, a single "distributed" directory may be stored across many servers, wherein each server supports a subtree of the directory. In particular, a known distributed directory environment includes one or more LDAP "backend" servers and a proxy server that acts as an intermediate agent between a client and the distributed directory environment. Clients bind to the proxy server instead of directly binding to the backend LDAP servers.

A set of rules that controls how passwords are used and administered in this type of directory environment is known as a "password policy." These rules enforce various security requirements, e.g., that a user change his or her password periodically, that the user's selected password meets certain requirements for construction, that re-use of an old password is prevented, that entities are locked out after a certain number of failed attempts to use a given password, and so on. A "user" refers to any LDAP client application that has an identity in the directory. In an LDAP distributed directory environment, a given password policy is defined according to an object-oriented schema that defines a password policy object class, which includes a set of administrative password policy attributes, together with a set of operational attributes that hold general policy state information for each user. The policy also includes one or more "controls" that are used while enforcing password policy. In particular, a "request control" is defined as a control that is sent by a client with a request operation to elicit a "response control." The "response control" typically contains one or more warnings and errors associated with password policy. Further details of how to implement password policy in this manner is described in Behera et al., "Password Policy for LDAP Directories", Internet Draft RFC, October 2001.

SUMMARY OF THE INVENTION

The illustrative embodiments provide a computer implemented method, data processing system, and computer program product for reducing the overhead associated with distributed password policy enforcement operations using a proxy server. When a proxy server provides a request from a client to a backend directory server, the proxy server determines whether a password policy check is required to be performed at the backend directory server. If a password policy check is not required to be performed at the backend directory server, the proxy server sends the client request together with a skip password policy control to the backend directory server. This skip password policy control informs the backend directory server to skip the password policy check on the client request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

In general, the devices that may comprise or relate to the present invention include a wide variety of data processing technology. Therefore, as background, a typical organization of hardware and software components within a distributed data processing system is described prior to describing the present invention in more detail.

Figure 1A:
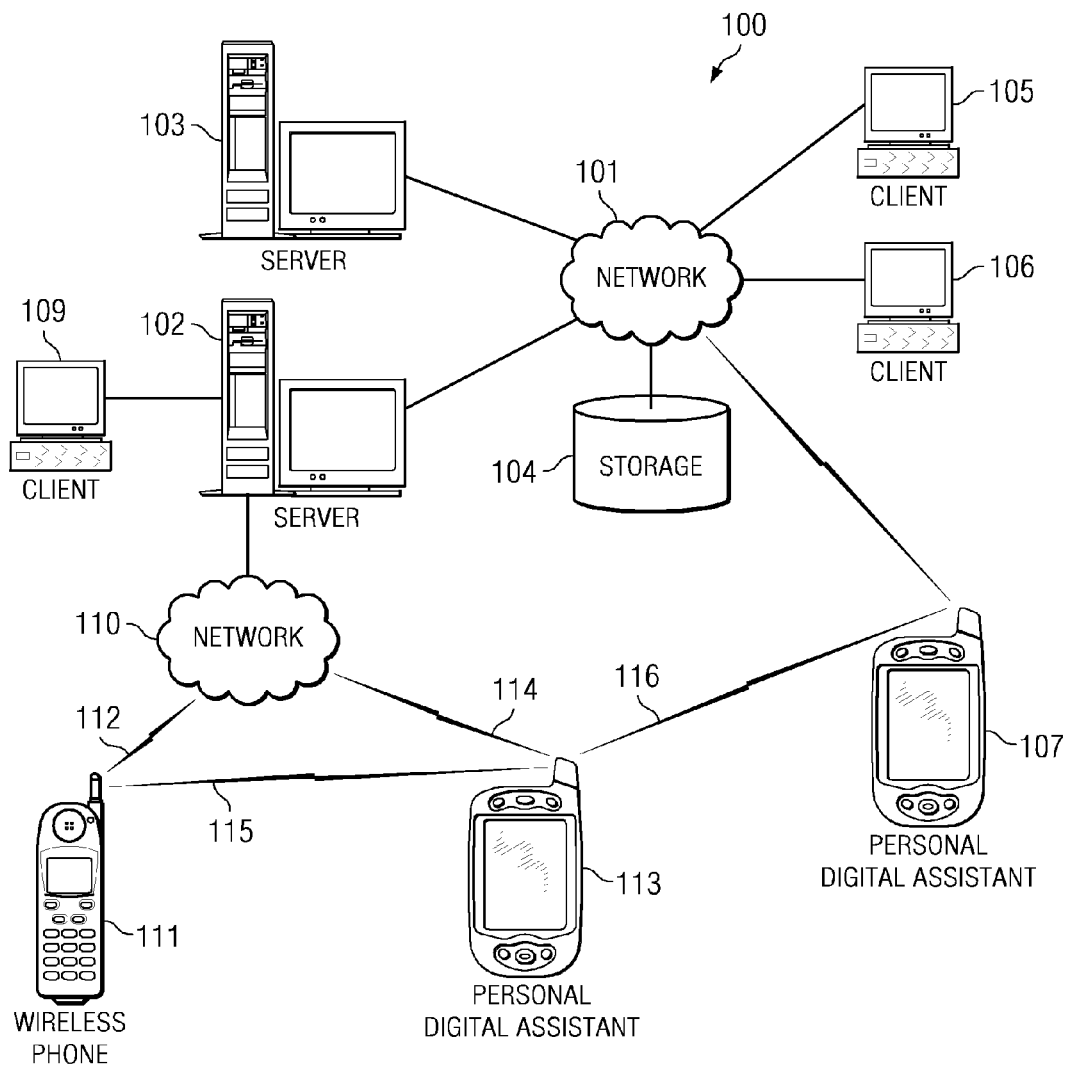
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), and the like. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), and so on. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth wireless technology, to create so-called personal area networks (PAN) or personal ad-hoc networks. In a similar manner, PDA 113 can transfer data to PDA 107 via wireless communication link 116.

The illustrative embodiments may be implemented on a variety of hardware platforms; FIG. 1A is intended as an example of a heterogeneous computing environment and not as an architectural limitation for the illustrative embodiments.

Figure 1B:
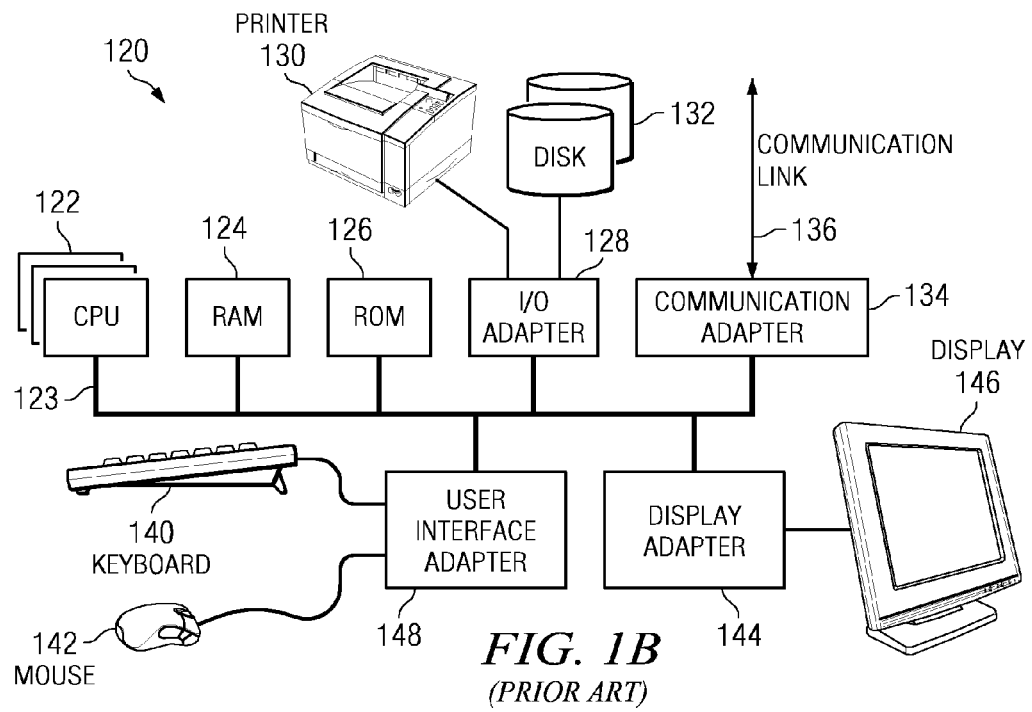
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, and the like. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the illustrative embodiments.

In addition to being able to be implemented on a variety of hardware platforms, the illustrative embodiments may be implemented in a variety of software environments A typical operating system may be used to control program execution within each data processing system. For example, one device may run a UNIX operating system, while another device contains a simple Java runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The illustrative embodiments may be implemented on a variety of hardware and software platforms, as described above with respect to FIG. 1A and FIG. 1B. More specifically, though, the illustrative embodiments are directed to an improved distributed data processing environment. Prior to describing the illustrative embodiments in more detail, some aspects of typical distributed data processing environments are described.

The descriptions of the figures herein may involve certain actions by either a client device or a user of the client device. One of ordinary skill in the art would understand that responses and/or requests to/from the client are sometimes initiated by a user and at other times are initiated automatically by a client, often on behalf of a user of the client. Thus, when a client or a user of a client is mentioned in the description of the figures, it should be understood that the terms "client" and "user" can be used interchangeably without significantly affecting the meaning of the described processes.

Certain computational tasks may be described below as being performed by functional units. A functional unit may be represented by a routine, a subroutine, a process, a subprocess, a procedure, a function, a method, an object-oriented object, a software module, an applet, a plug-in, an Active control, a script, or some other component of firmware or software for performing a computational task.

The descriptions of the figures herein may involve an exchange of information between various components, and the exchange of information may be described as being implemented via an exchange of messages, e.g., a request message followed by a response message. It should be noted that an exchange of information between computational components, which may include a synchronous or asynchronous request/response exchange, may be implemented equivalently via a variety of data exchange mechanisms, such as messages, method calls, remote procedure calls, event signaling, or other mechanism.

The illustrative embodiments are described below with respect to terminology and functionality as associated with X.500 directories and Lightweight Directory Access Protocol (LDAP) operations, but it should be noted that the illustrative embodiments may be implemented using a variety of directory implementation schemes and protocols.

Figure 1C:
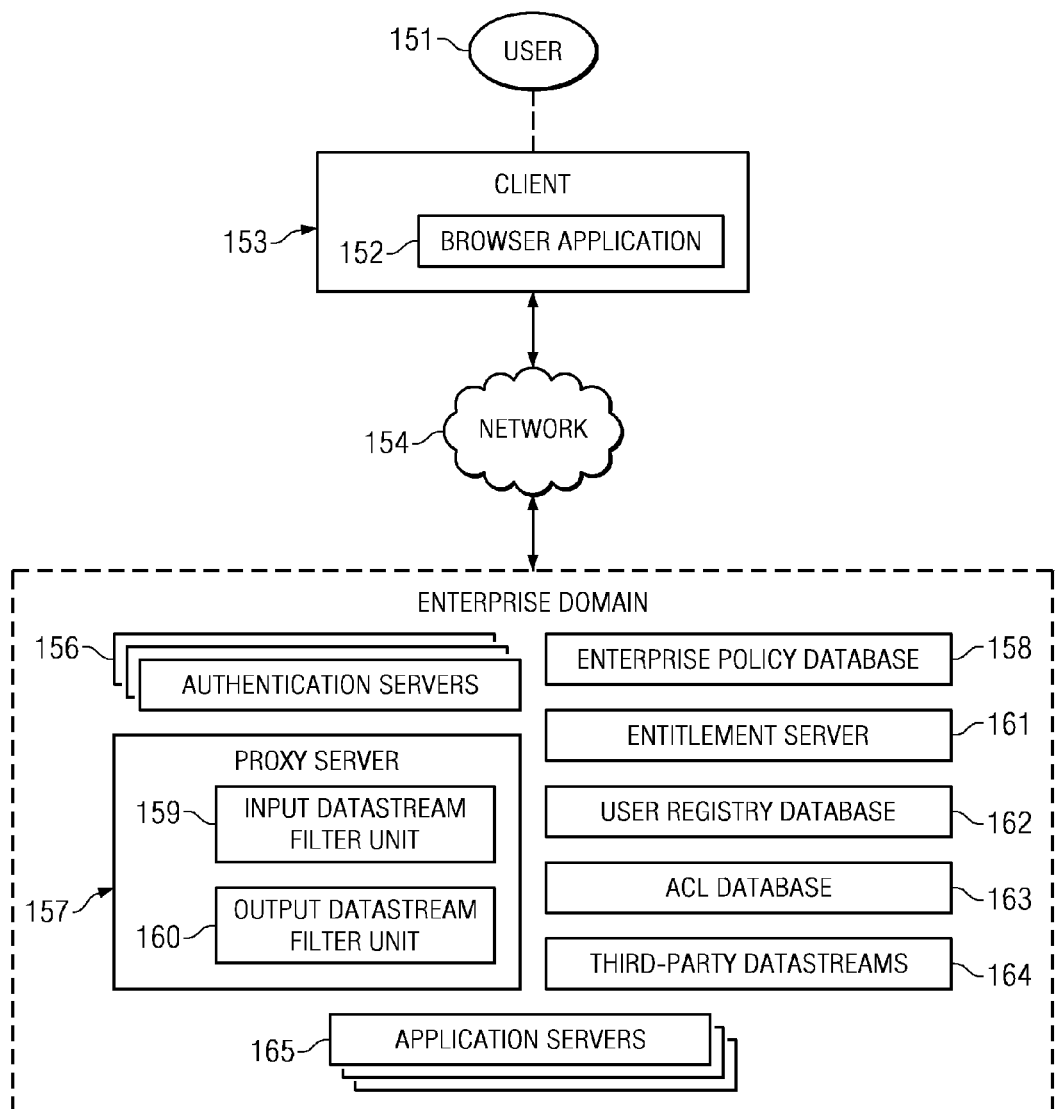
FIG. 1C depicts a block diagram that shows a typical distributed data processing system for an enterprise domain.

With reference now to FIG. 1C, a block diagram depicts a typical distributed data processing system for an enterprise domain. As in a typical corporate computing environment or an Internet-based computing environment, enterprise domain 150 hosts controlled resources that user 151 can access, e.g., by using browser application 152 on client device 153 through network 154.

Enterprise domain 150 supports multiple servers. Application servers 165 support accessible resources through web-based applications or other types of applications, including legacy applications. Authentication servers 156 support various authentication mechanisms, such as username/password, X.509 certificates, secure tokens, or an SSL session.

Proxy server 157 performs a wide range of functions for enterprise domain 150. Proxy server 157 can be administratively configured through configuration files and enterprise policy database 158 to control the functionality of proxy server 157, e.g., caching web pages in order to mirror the content from an application server or filtering the incoming and outgoing datastreams through input datastream filter unit 159 and output datastream filter unit 160. Input datastream filter unit 159 may perform multiple checks on incoming requests while output datastream filter unit 160 may perform multiple checks on outgoing responses; each check may be performed in accordance with goals and conditions that are specified within various enterprise policies.

Enterprise domain 150 comprises entitlements server 161, which accepts information within user registry database 162, access control list (ACL) database 163, and third-party datastreams 164 from other domains. Entitlements server 161 determines whether users are authorized to access certain services that are provided by application servers 165 within domain 150 by checking policies and/or access control lists against user requests for those services. A set of user-specific entitlements is used by proxy server 157, entitlement server 161, or a combined or coordinated effort between proxy server 157 and entitlement server 161 to determine or control access to application servers 165 and other controlled resources in response to user requests.

The above-noted entities within enterprise domain 150 represent typical entities within many computing environments. Web-based applications can utilize various means to prompt users to enter authentication information, often as a username/password combination within an HTML form. In the example that is shown in FIG. 1C, user 151 may be required to be authenticated before client 153 may have access to resources, after which a session is established for client 153. In FIG. 1C, after receiving an incoming request from client 153, input datastream filter unit 159 may determine whether client 153 has already established a session; if not, an authentication service on authentication servers 156 can be invoked in order to authenticate user 151. If client 153 has already established a session, then additional checks may be performed on an incoming request prior to granting access to a controlled resource; the additional checks may be specified in an enterprise authentication policy.

Figure 2:
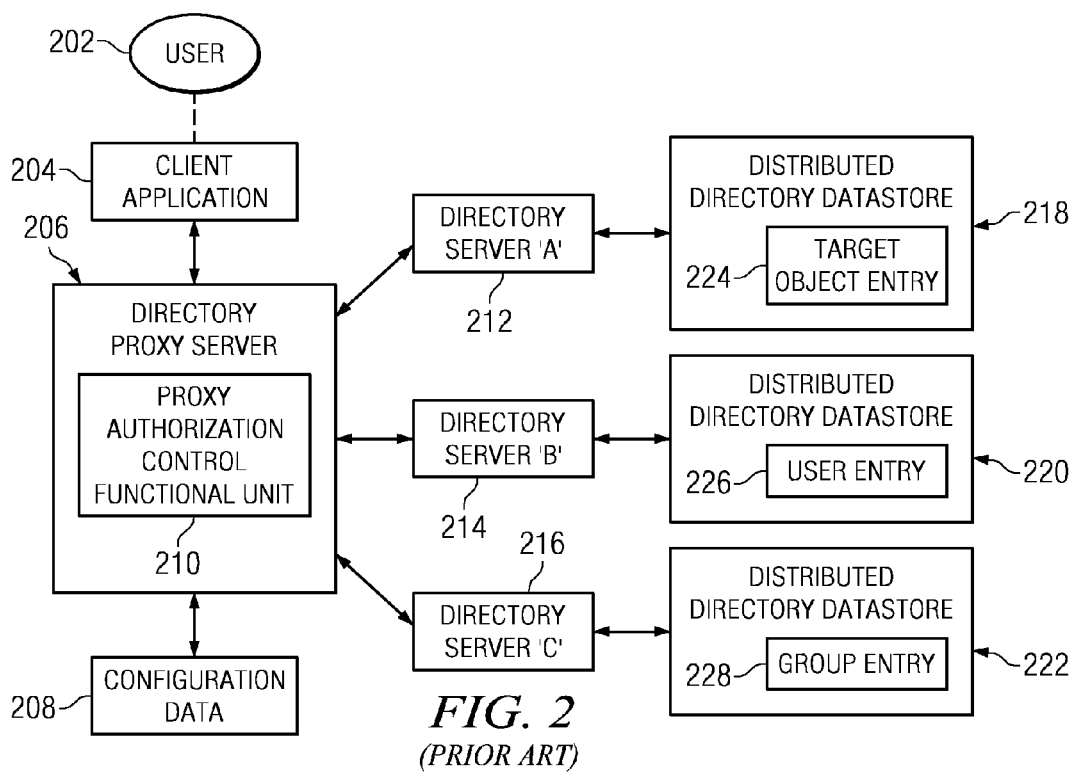
FIG. 2 depicts a block diagram that shows a typical distributed directory environment.

With reference now to FIG. 2, a block diagram depicts a typical distributed directory environment. User 202 operates client application 204, which may execute on a client device such as client 153 as shown in FIG. 1C. Client application 204 interacts with directory servers through a proxied directory server, also known as a directory proxy server or a proxy directory server, which is shown as proxy server 206; proxy server 206 may execute on the user's client device or elsewhere within a network of connected devices, such as those shown in FIG. 1A. Proxy server 206 may be associated with configuration files 208 that contain information that is managed via an administrative user application to control the functionality of proxy server 206.

Proxy server 206 acts as an intermediate agent (an "intermediary") to the distributed directory environment. Although only one proxy server is shown, there may be multiple such proxy servers or proxy server instances running on one or more physical machines. Proxy server 206 is able to perform operations in accordance with a variety of directory schemes and protocols, including LDAP specifications. Proxy server 206 contains proxy authorization control functional unit 210, which generates proxy authorization controls, also called proxied authorization controls, that are employed by proxy server 206 to perform an operation with respect to the distributed directory on behalf of client application 204, or equivalently, on behalf of user 202. As described in Wahl et al., "Lightweight Directory Access Protocol (v3)", IETF RFC 2251, December 1997, a control is a way to specify extension information for use with an LDAP operation. Controls can be sent as part of an LDAP request and apply only to the accompanying request. If the server recognizes the control type and it is appropriate for the operation, the server will make use of the control when performing the requested operation; various optional parameters can be used to inform the server whether or not to ignore the control if it is unrecognized or it is inappropriate. The control also contains an object identifier that has been assigned to the control.

Hence, proxy authorization control functional unit 210 can present an application programming interface (API) that accepts a proxy distinguished name (DN) as an input parameter; this input parameter specifies the distinguished name of the entry of the identity that proxy server 206 is to assume when performing an operation on behalf of client application 204 or user 202. The provided API can be used by the caller to create an LEAP control containing the proxy authorization identity; the created proxy authorization control would then be included in LDAP operations to request an operation from a directory server. Using the proxy authorization control mechanism, a client, or in this case, proxy server 206, can bind to the directory engine using its own identity, but is granted proxy authorization rights of another user, i.e. user 202 or client application 204, to access the target directory.

When the LDAP server receives an operation with proxy authorization control, the bind distinguished name is validated against the administrative group and/or the predefined proxy authorization group to determine whether the bind distinguished name should be granted the proxy authorization right. In other words, the bound application client, which is proxy server 206 in this example, must be a member of the administrative group or proxy authorization group to request a proxy authorization operation. More information about using a proxy authorization control can be found in Weltman, "LDAP Proxied Authorization Control," IETF Internet-Draft, draft-weltman-1dapv3-proxy-12.txt, April 2003. The LDAP protocol also supports an extension mechanism that allows additional operations to be defined for services that are not defined within the LDAP specification. An extended operation allows clients to make requests and receives responses with predefined syntaxes and semantics that may be specific to particular implementations.

The distributed directory environment includes multiple directory servers 212-216 that interoperate within the same distributed data processing environment as proxy server 206 and client application 204, e.g., in a manner similar to the distributed data processing environments that are shown in FIG. 1A and FIG. 1C. Directory servers 212-216 support functionality for accessing datastores that contain portions of a distributed directory, i.e. portions of a directory information tree, shown as distributed directory datastores 218-222. Directory servers 212-216 also contain functionality, which is not shown in FIG. 2, that supports the receipt and processing of proxied authorization controls, e.g., as may be sent by proxy server 206 or other directory clients. A typical directory server is a relational database management (RDBM) server.

In a manner similar to the scenario that was described further above, user entries, group entries, and target object entries that are of interest to a particular directory operation may reside in different portions of a distributed directory that are supported on different systems. In the example that is shown in FIG. 2: target object entry 224 resides within distributed directory datastore 218; user entry 226 resides within distributed directory datastore 220; and group entry 228 resides within distributed directory datastore 222. These locations are merely representative.

Thus, a distributed directory is a directory environment in which data is partitioned across multiple directory servers. As illustrated in FIG. 2, the distributed directory typically comprises a collection of machines including relational database management (RDBM) servers holding data, and one or more proxy servers managing the topology. A representative proxy server may be an IBM® Tivoli® Directory Server that provides, among other functions, request routing, load balancing, failover, distributed authentication and support for distributed/membership groups and partitioning of containers. As described above, the directory proxy server sits at the front-end of a distributed directory and provides efficient routing of user requests thereby improving performance, and providing a unified directory view to the client. The proxy server also provides data support for groups and ACLs that are not affected by partitioning, and support for partitioning of flat namespaces.

Figure 3:
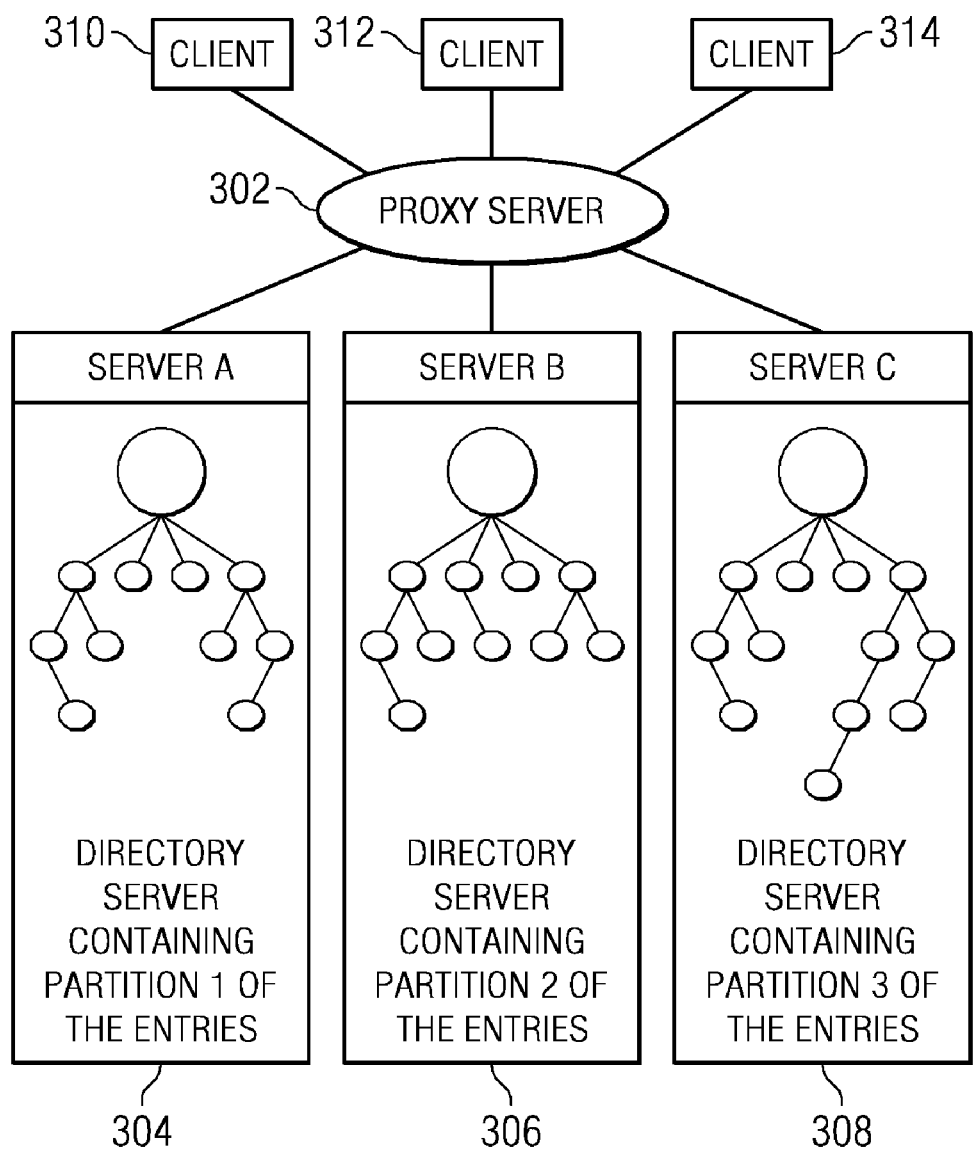
FIG. 3 illustrates a distributed directory configuration in accordance with the illustrative embodiments.

FIG. 3 is a block diagram that depicts a typical distributed directory configuration in more detail in accordance with the illustrative embodiments. Proxy server 302 is configured with connection information to connect to each of the backend directory servers A 304, B 306, and C 308 for which it is proxying. Typically, the connection information comprises of host address, port number, bind distinguished name, credentials and a connection pool size. Each of back-end directory servers A 304, B 306, and C 308 is configured with the distinguished name and credentials that proxy server 302 uses to connect to it. The distinguished name must be a member of the backend directory server's (local) administration group or local administrator. In particular, the distinguished name must have administrative and proxy authorization authority. Proxy server 302 is also configured with partition information, which determines how the data is distributed between the backend servers.

In this illustrative example, servers A 304, B 305, and C 308 have their data split within a "container" (under some entry in the directory tree). Because proxy server 302 handles the routing of requests to the appropriate servers, no referrals are used. Client applications 310, 312, and 314 need only be aware of proxy server 302. Client applications 310, 312, and 314 never have to authenticate with servers A 304, B 306, and C 308.

Data within directory servers A 304, B 306, and C 308 may include user entries, user policy entries, group policy entries, and global policy entries. Since multiple policy definitions may apply to a single user, a set of data comprising policy definitions for the user may be partitioned across the directory servers. For instance, server A 304 is shown to contain a first partition of the entries, server B 306 is shown to contain a second partition of the entries, and server C 308 is shown to contain a third partition of the entries.

As previously mentioned, a password policy comprises a set of rules that controls how passwords are used and administered in a distributed directory environment. These rules enforce various security requirements, e.g., that a user change his or her password periodically, that the user's selected password meets certain requirements for construction, that re-use of an old password is prevented, that entities are locked out after a certain number of failed attempts to use a given password, and so on. Password policy enforcement for a user is performed in several key situations: (1) at bind time, such as when the user requests a simple bind to the proxy server, (2) when a user is added to the system, (3) when a bound user requests to modify the bound user's password, (4) when a bound user requests to modify a different user's password, and (5) during password policy pre and post bind extended operations. A pre-bind extended operation may include checking if an account is locked. A post-bind extended operation may include checking for expired passwords, grace logins, and updating failed/successful bind counters. For example, two extended operations may be implemented in the RDBM backend server; they are a Password Policy Initialize and Verify Bind Extended Operation, and a Password Policy Finalize and Verify Bind Extended Operation. Both extended operations may be enabled or disabled via a setting in an LDAP configuration file, e.g., in the cn=Directory, cn=RDBM Backends, cn=Company Directory, cn=Schemas, cn=Configuration entry. The Password Policy Initialize and Verify Bind Extended Operation accepts a bind distinguished name and is performed when bound as an administrator. Preferably, the extended operation is implemented on an RDBM backend server and simply calls in to the RDBM to the pre-bind password policy code. The extended operation checks to see if the target user's account is locked. Possible return codes include codes for internal server error, the users account is locked, invalid distinguished name or password, requester does not have permission to perform the request, and the like. The Password Policy Finalize and Verify Bind Extended Operation accepts a bind distinguished name and return code and is performed when bound as an administrator. The extended operation is implemented on an RDBM backend server and calls in to the RDBM to the post-bind password policy code. The extended operation checks if a password is expired and if any grace logins are left. The extended operation also updates the success and failure counts/times on the entry. More information on pre and post bind extended operations may be found in U.S. patent application Ser. No. 11/776,292 (at least in page 20, lines 17 to page 24, line 9) entitled "Method and System for Enforcing Password Policy for an External Bind Operation in a Distributed Directory" and filed Jul. 11, 2007, assigned to the same assignee herein, and which is incorporated by reference.

Since data in a distributed directory system is partitioned and stored on different servers in the system, password policy definitions for a user or user group may be partitioned and distributed across the different servers. When the policy data is partitioned across directory backend servers in this manner, a password policy check on a user request cannot be performed at a single directory backend server level. Instead, the proxy server must obtain policy information distributed across the directory backend servers to determine the complete effective password policy for the user, and then enforce that policy.

A mechanism for reducing the overhead associated with distributed password policy enforcement operations using a proxy server by providing a mechanism for enforcing password policy when the policy definitions for a user or user group are partitioned and distributed across different directory servers is disclosed in U.S. patent application Ser. No. 11/971,510 (at least in paragraphs 0053-0119) entitled "Password Policy Enforcement in a Distributed Directory when Policy Information is Distributed" and filed Jan. 9, 2008, assigned to the same assignee herein, and which is incorporated by reference. In particular, U.S. patent application Ser. No. 11/971,510 discloses that to enforce password policy on a user request in a distributed directory environment where a set of policy data is partitioned across directory servers, a proxy server performs two steps: first, the proxy server collects policy entries stored across different directory servers for the user and determines the user's effective password policy in response to a request by the user to access data stored in the directory backend servers; and second, the proxy server communicates the effective password policy to the directory backend servers in the form of an Effective Password Policy Control, so the backend servers can use the collected policy information when enforcing the policy on the user request. The effective password policy for a user is the combination of all policy information applicable to the user (i.e., policy definitions that apply to the individual user, policy definitions that apply to groups of which the user is a member, and the global level policy) stored on the directory backend servers. In determining the effective password policy of a target user, the proxy server collects the policy definitions that apply to the target user. The proxy server also collects all the policy definitions that apply to the groups of which the target user is a member. This process includes collecting all the groups of which the target user is a member and collecting the policy definitions that correspond to those groups. The proxy server also collects the global level policy. These collected policies are then combined to determine the effective password policy for the target user. The Effective Password Policy Control may be provided by the proxy server to the backend directory servers to allow the backend servers to determine, based on the user's effective password policy, if the user-requested operation is allowed.

The illustrative embodiments provide a mechanism for reducing the overhead associated with distributed password policy enforcement operations using a proxy server. This mechanism may be used when the policy definitions for a user or user group are partitioned and distributed across different directory servers, or alternatively, the mechanism may be used when the password policy definitions for a user are not partitioned and distributed across directory servers, but rather stored on each backend directory server. This mechanism allows for minimizing the number of password policy enforcement operations. Currently, the backend servers need the policy information sent in the Effective Password Policy Control because the backend servers perform a password policy check every requested operation. For example, in a distributed directory environment, the proxy server establishes connections to the backend servers using an administrative ID. Operations are performed on behalf of a requesting client by using a Proxy Authorization Control. When the backend servers receive the Proxy Authorization Control, the backend servers look up the password policy of the user or use the policy information sent in the Effective Password Policy Control for pre-bind checking to determine if the requesting user's account is locked. Thus, for each requested operation, policy information for a user is required by the backend servers for password policy enforcement, which is inefficient and unnecessary.

To reduce the amount of overhead in policy enforcement at the directory backend servers, the proxy server in the illustrative embodiments sends a Skip Password Policy Control to the backend servers in certain situations to indicate to the backend servers that no password policy check needs to be performed for the requested operation. The Skip Password Policy Control is a new control which contains the target user distinguished name for which policy enforcement is to be skipped. Password policy checking may be skipped when the proxy server determines, from the cached password policy state of the requesting user, that the operation requested by the user is an allowed operation. Thus, if a subsequent request from the user comprises an operation which does not require the backend servers to perform an additional policy check based on the cached password policy state, policy information is not needed at the backend servers, and the proxy server uses the new Skip Password Policy Control to inform the backend servers that password policy checking for the operation can be skipped. The proxy server sends this control for a bound user on all requests, except those requests requiring additional password policy enforcement by the backend servers (e.g., requests for adding a user entry, modifying the user's password, modifying a different user's password, and password policy pre and post bind extended operations). If the requested operation requires additional password policy enforcement, the proxy server sends the Effective Password Policy Control to the backend servers. Thus, when policy information is contained in a distributed environment, every operation sent to a backend server will contain either the Effective Password Policy Control or the Skip Password Policy Control for the bound or binding user.

Figure 4:
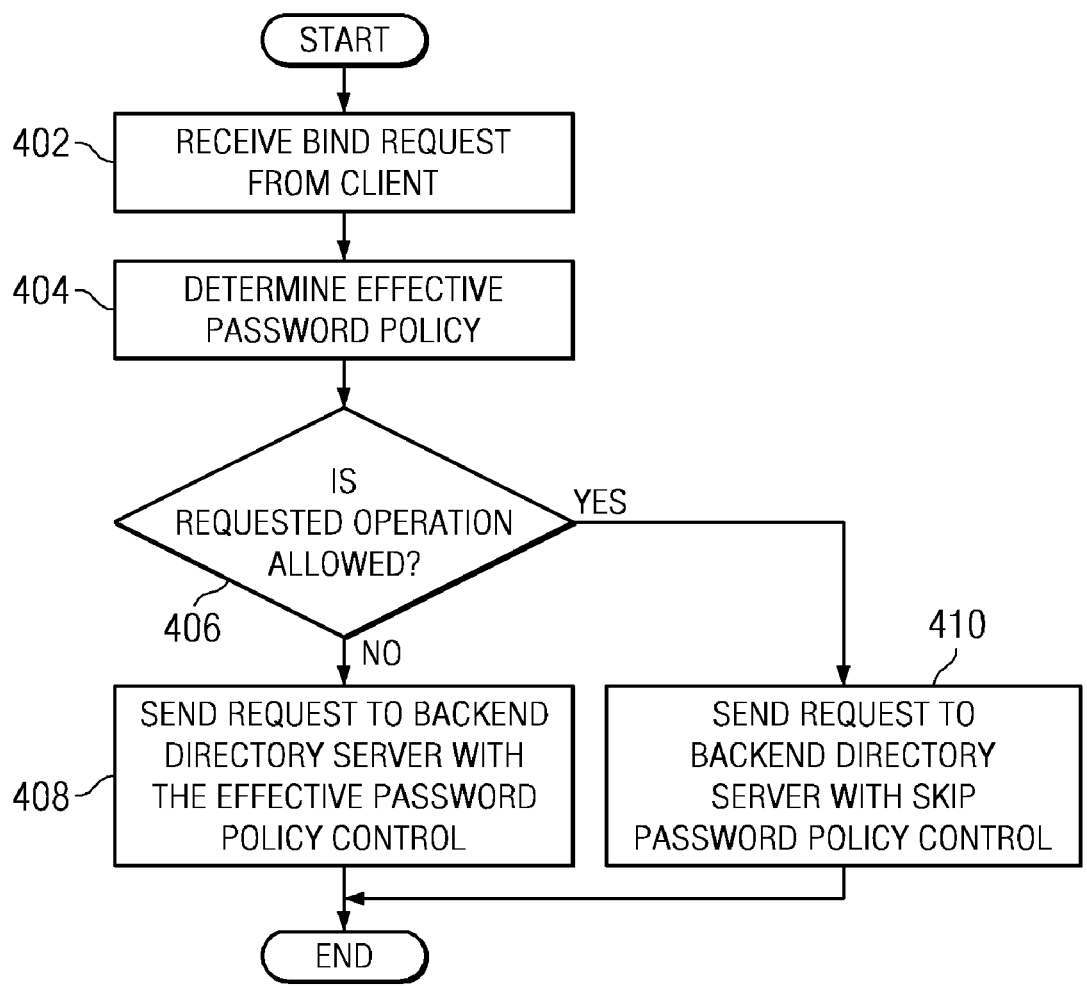
FIG. 4 illustrates a high level flowchart of a process in a proxy server for reducing the overhead associated with distributed password policy enforcement operations in accordance with the illustrative embodiments.

FIG. 4 illustrates a high level flowchart of a process for reducing password policy enforcement operations in accordance with the illustrative embodiments. The process described in FIG. 4 may be implemented in a proxy server, such as proxy server 206 in FIG. 2.

The process begins when a proxy server receives a subsequent request from a bound user in a distributed directory (step 402). In response to receiving the request, the proxy server determines the effective password policy for the bound user (step 404). A method for determining the effective password policy for the bound user is disclosed in U.S. patent application Ser. No. 11/971,510, which is incorporated by reference as stated above.

The proxy server checks the password policy state of the requesting user in its cache to determine whether the password policy state indicates that the requested directory operation is an allowed operation (step 406). An allowed operation is one which has already been policy checked and enforced by the proxy server. If the cached password policy state indicates that the requested operation is not allowed, the proxy server sends the request to the backend directory server with the Effective Password Policy Control for the bound user (step 408).

If the cached password policy state indicates that the requested operation is allowed, the proxy server sends the request for the backend directory server with the Skip Password Policy Control for the bound user (step 410). The Skip Password Policy Control is a new control which is used by the proxy server to inform the backend servers that password policy checking can be skipped for the bound user. The new control contains the target user distinguished name for which policy enforcement is to be skipped. In the initial request from the user, the backend directory server has already performed the policy check on a requested operation. The proxy server caches this policy check information for the connection. If no additional password policy enforcement is required for the requested operation (e.g., if the request is not a request for adding a user entry, modifying the user's password, modifying a different user's password, and password policy pre and post bind extended operations), there is no need for the backend servers to perform the password policy check for the subsequent operation. Thus, the backend servers do not need the policy information. When the backend directory servers receive the subsequent request for a bound user comprising the Skip Password Policy Enforcement Control, the backend directory servers do not perform password policy checking on the user request. The Skip Password Policy Control is only honored when sent by administrative users to ensure that normal users cannot circumvent password policy checking when required.

Figure 5:
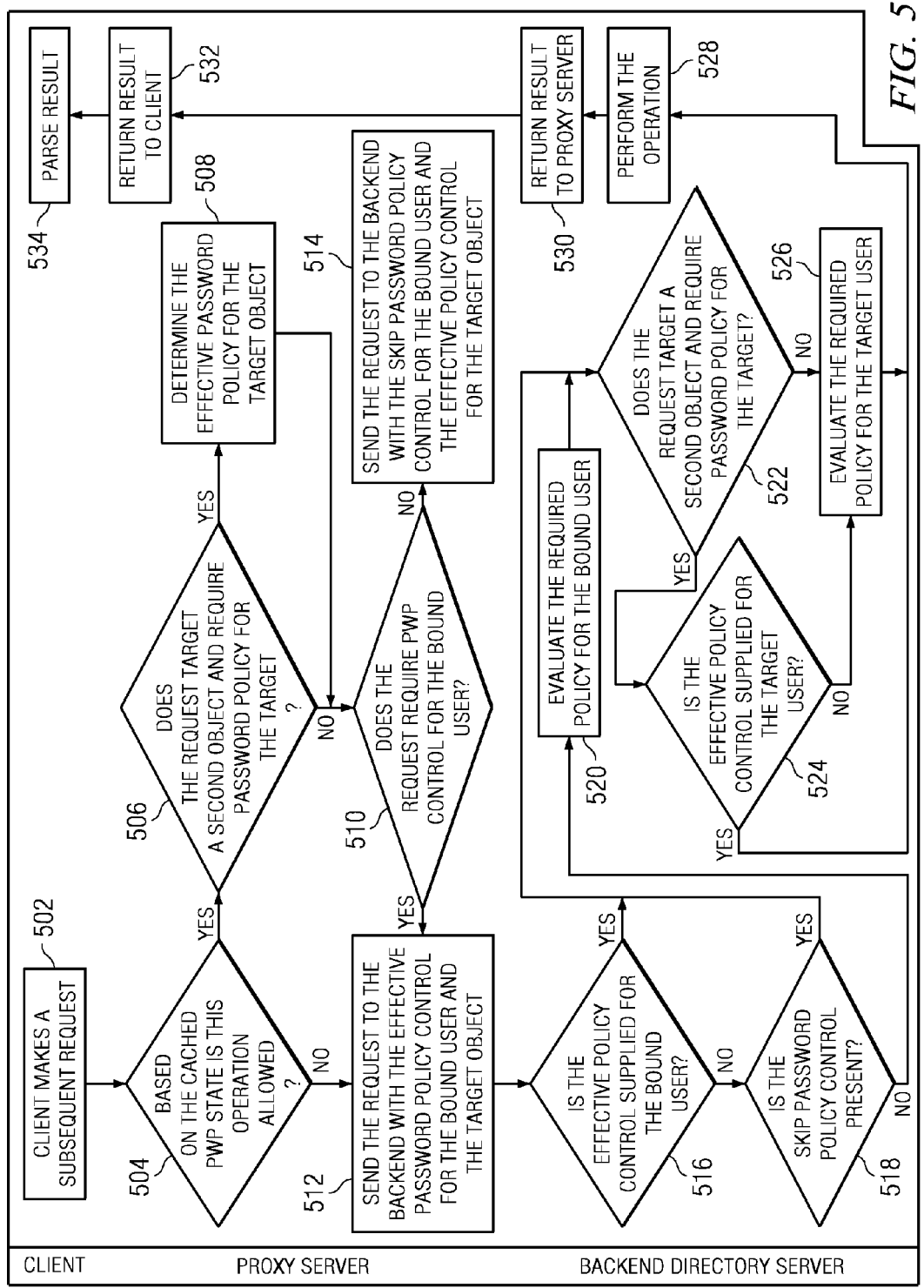
FIG. 5 illustrates a flowchart of a particular process for minimizing overhead associated with distributed password policy enforcement operations in accordance with the illustrative embodiments.

FIG. 5 illustrates a flowchart of a particular process for reducing the overhead associated with distributed password policy enforcement operations in accordance with the illustrative embodiments. The process described in FIG. 5 is used by the proxy server to determine the policy control to provide to a backend directory server, and by the backend server to determine whether or not to perform a policy check on the operation requested by the user. The particular process in FIG. 5 illustrates the case of a subsequent request by a bound user to add or modify a different user's (target object) password.

The process begins when a client bound to the proxy server sends a subsequent request to the proxy server for a subsequent directory operation (step 502). When the proxy server receives the request, the proxy server checks the password policy state of the requesting user in its cache to determine whether the password policy state indicates that the requested directory operation is an allowed operation (step 504). An allowed operation is one which has already been policy checked and enforced by the proxy server. If the password policy state indicates that the requested operation is not allowed, the process continues to step 512.

If the operation is allowed, the proxy server determines whether the request from the bound client targets a second object and requires a password policy for the target (step 506). If the request does not target a second object and does not require a password policy for the target, the process continues to step 510. However, if the request targets a second object and requires a password policy for the target, the proxy server determines the effective password policy for the target object (step 508).

At step 510, the proxy server determines if the request requires a Password Policy Control for the bound user. A Password Policy Control is required for the bound user if the cached password policy state does not indicate that the request is an allowed operation. If the request requires a Password Policy Control for the bound user, the proxy server sends the request to the backend server with the Effective Password Policy Controls for the bound user and the target object (step 512), with the process continuing to step 516. If the request does not require a Password Policy Control for the bound user, the proxy server sends the request to the backend server with the Skip Password Policy Control for the bound user and the Effective Password Policy Control for the target object (step 514), with the process continuing to step 516.

At step 516, the backend directory server receives the request and determines if the Effective Password Policy Control has been supplied for the bound user. If the Effective Password Policy Control has been supplied, the process continues to step 522. If the Effective Password Policy Control has not been supplied, the backend server determines if the Skip Password Policy Control has been supplied for the bound user (step 518). If the Skip Password Policy Control has been supplied, the process continues to step 522. If the Skip Password Policy Control has not been supplied, the backend directory server evaluates the required policy for the bound user (step 520), with the process continuing to step 522. The backend directory server would need to evaluate the required policy for the bound user in situations where the client binds directly to a backend server and bypasses the proxy server, when password policy is not distributed, or in an environment without a proxy server.

At step 522, the backend directory server determines whether the request from the bound client targets a second object and requires a password policy for the target (step 522). If the request does not target a second object and does not require a password policy for the target, the process continues to step 526. However, if the request targets a second object and requires a password policy for the target, the backend directory server determines if the Effective Password Policy Control has been supplied for the target object (step 524). If the Effective Password Policy Control has been supplied for the target object, the process continues to step 528. However, if the Effective Password Policy Control has not been supplied for the target object, the backend directory server evaluates the required policy for the target object (step 526), with the process continuing to step 528.

At step 528, the backend directory server performs the requested operation. The backend directory server then returns the operation result to the proxy server (step 530).

When the proxy server receives the operation result, the proxy server returns the operation result to the client (step 532). The client parses the operation result from the proxy server (step 534).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device. The program code may be stored in a computer readable storage medium in a client data processing system or a server data processing system.

The invention can also take the form of a computer program product which has been downloaded over a network from one device to another for use in the other device. For instance, the program code stored in a computer readable storage medium in a server data processing system may be downloaded over a network from the server to a remote data processing system, such as a client or another server. Likewise, the program code stored in a computer readable storage medium in a client data processing system may be downloaded over a network from the client to a remote data processing system, such as a server or another client.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for reducing overhead associated with password policy enforcement operations in a distributed directory using a proxy server, the computer implemented method comprising:
    by a proxy server, establishing connections to backend directory servers, wherein establishing the connections to the backend directory servers comprises:
        requesting a portion of a password policy for a client from each of the backend directory servers, wherein the password policy is a set of security requirements for a password of a user of the client; and
        generating, by the proxy server, an effective password policy for the client using each portion of the password policy;
    while providing a subsequent request from the client to one of the backend directory server, wherein the client is a bound client to the proxy server, the proxy server determining whether a password policy check is required to be performed at the backend directory server; and
    responsive to determining that the password policy check is not required to be performed at the backend directory server, sending the client request together with a skip password policy control to the backend directory server, wherein the skip password policy control informs the backend directory server to skip the password policy check on the client request.

2. The computer implemented method of claim 1, wherein the password policy check is required to be performed at the backend directory server when a cached password policy state stored for a previous request of the client indicates that the request is not allowed.

3. The computer implemented method of claim 1, wherein the skip password policy enforcement control comprises a distinguished name of the client for which policy enforcement is to be skipped.

4. The computer implemented method of claim 1, wherein the skip password policy control is honored by the backend directory server only when the skip password policy enforcement control is sent by an administrative user.

5. The computer implemented method of claim 1, wherein the determination whether the password policy check is required to be performed at the backend directory server is performed according to a type of the request from the client.

6. The computer implemented method of claim 5, wherein the type of the request in which the password policy check is required on the backend directory server comprises any operation requiring password policy.

7. The computer implemented method of claim 6, wherein the operation requiring the password policy includes bind operations, modify operations on a user password, add operations for a user entry containing a password, and pre and post bind password policy extended operations used for external binds in the distributed directory.

8. The computer implemented method of claim 5, wherein the type of request in which the password policy check is not required on the backend directory server includes a password search, a modify operation on a non-password attribute, or a delete operation.

9. The computer implemented method of claim 1, further comprising:
    responsive to receiving the request from the client, performing a bind operation to bind the client to the proxy server, wherein performing the bind operation includes determining if an account of the client is locked.

10. The computer implemented method of claim 1, wherein determining whether the password policy check is required to be performed at the backend directory server comprises:
    determining whether the request is an allowed operation according to the effective password policy for the client; and
    responsive to a determination that the request is an allowed operation according to the effective password policy for the client, determining that the password policy check is not required to be performed at the backend directory servers.

11. A computer program product for reducing overhead associated with password policy enforcement operations in a distributed directory using a proxy server, the computer program product comprising:
    a non-transitory computer usable medium having computer usable program code tangibly embodied thereon, the computer usable program code comprising:
    computer usable program code for establishing, by a proxy server, connections to backend directory servers, wherein the computer usable program code for establishing the connections to the backend directory servers comprises:
        computer usable program code for requesting a portion of a password policy for a client from each of the backend directory servers, wherein the password policy is a set of security requirements for a password of a user of the client; and
        computer usable program code for generating, by the proxy server, an effective password policy for the client using each portion of the password policy;
    computer usable program code for determining, by the proxy server, while providing a subsequent request from the client to one of the backend directory server, wherein the client is a bound client to the proxy server, whether a password policy check is required to be performed at the backend directory server; and
    computer usable program code for sending the client request together with a skip password policy control to the backend directory server in response to determining that the password policy check is not required to be performed at the backend directory server, wherein the skip password policy control informs the backend directory server to skip the password policy check on the client request.

12. The computer program product of claim 11, wherein the password policy check is required to be performed at the backend directory server when a cached password policy state stored for a previous request of the client indicates that the request is not allowed.

13. The computer program product of claim 11, wherein the skip password policy control comprises a distinguished name of the client for which policy enforcement is to be skipped.

14. The computer program product of claim 11, wherein the skip password policy control is honored by the backend directory server only when the skip password policy enforcement control is sent by an administrative user.

15. The computer program product of claim 11, wherein the determination whether the password policy check is required to be performed at the backend directory server is performed according to a type of the request from the client.

16. The computer program product of claim 15, wherein the type of request in which the password policy check is required on the backend directory server comprises any operation requiring password policy.

17. The computer program product of claim 11, wherein the computer usable program code is stored in the non-transitory computer usable medium in a data processing system, and wherein the computer usable program code is downloaded over a network from a remote data processing system.

18. The computer program product of claim 11, wherein the computer usable program code is stored in the non-transitory computer usable medium in a server data processing system, and wherein the computer usable program code is downloaded over a network from a remote data processing system for use in a computer readable storage medium with the remote system.

19. A data processing system for reducing overhead associated with password policy enforcement operations a distributed directory using a proxy server, the data processing system comprising:
- a bus;
- a storage device connected to the bus, wherein the storage device contains computer usable code;
- at least one managed device connected to the bus;
- a communications unit connected to the bus; and
- a processing unit connected to the bus, wherein the processing unit executes the computer usable code to establish, by a proxy server, connections to backend directory servers; determine, by a proxy server, while providing a subsequent request from a client to one of the backend directory server, wherein the client is a bound client to the proxy server, whether a password policy check is required to be performed at the backend directory server; and sending the client request together with a skip password policy control to the backend directory server in response to determining that the password policy check is not required to be performed at the backend directory server, wherein the skip password policy control informs the backend directory server to skip the password policy check on the client request, wherein the processing unit executing the computer usable code to establish the connections to the backend directory servers comprises the processing unit executing the computer usable code to request a portion of a password policy for the client from each of the backend directory servers, wherein the password policy is a set of security requirements for a password of a user of the client; and generating, by the proxy server, an effective password policy for the client using each portion of the password policy.

* * * * *